(12) United States Patent
Tang et al.

(10) Patent No.: US 11,131,100 B2
(45) Date of Patent: Sep. 28, 2021

(54) OUTDOOR LAMINATE FLOOR AND A MANUFACTURING TECHNIQUE THEREOF

(71) Applicant: ANHUI SENTAI WPC GROUP SHARE CO., LTD, Xuancheng (CN)

(72) Inventors: Shengwei Tang, Xuancheng (CN); Daoyuan Tang, Xuancheng (CN)

(73) Assignee: ANHUI SENTAI WPC GROUP SHARE CO., LTD, Xuancheng (CN)

( * ) Notice: Subject to any disclaimer, the term of this patent is extended or adjusted under 35 U.S.C. 154(b) by 0 days.

(21) Appl. No.: 16/765,187

(22) PCT Filed: Sep. 21, 2018

(86) PCT No.: PCT/CN2018/106843
§ 371 (c)(1),
(2) Date: May 19, 2020

(87) PCT Pub. No.: WO2019/196343
PCT Pub. Date: Oct. 17, 2019

(65) Prior Publication Data
US 2020/0347615 A1    Nov. 5, 2020

(30) Foreign Application Priority Data
Apr. 12, 2018   (CN) .......................... 201810326053.0

(51) Int. Cl.
*E04B 2/00*  (2006.01)
*E04F 15/02* (2006.01)
(Continued)

(52) U.S. Cl.
CPC .. *E04F 15/02183* (2013.01); *E04F 15/02038* (2013.01); *B32B 27/304* (2013.01); *E04F 15/107* (2013.01); *E04F 2201/0107* (2013.01)

(58) Field of Classification Search
CPC . E04F 15/02033; E04F 15/107; E04F 15/102; E04F 2201/042; E04F 2201/0107;
(Continued)

(56) References Cited

U.S. PATENT DOCUMENTS 8,893,850 B2 * 11/2014 Freedman ............... B32B 27/30
                                                      181/290
2002/0160144 A1 * 10/2002 Higgins .................. E04F 15/02
                                                       428/95
(Continued)

FOREIGN PATENT DOCUMENTS

CN          101372545 A    2/2009
CN          104358385 A    2/2015
(Continued)

*Primary Examiner* — Chi Q Nguyen
(74) *Attorney, Agent, or Firm* — Bayramoglu Law Offices LLC

(57) ABSTRACT

An outdoor laminate floor includes a substrate made from PVC foaming and a wear-resistant, anti-aging covering film that is adhered to the surface of the substrate. The covering film overlays the surface of the substrate after being adhered by hot glue. The covering film is a modified weather-resistant polymeric film. In this way, the outdoor laminate floor has a simple and compact structure, and solid wood is replaced with the substrate and the covering film, which not only protects environment by reducing the use of solid wood, but also reduces the manufacturing cost and improves the competitive edge on the market, owing to the low-cost substrate and covering film.

7 Claims, 1 Drawing Sheet

(51) Int. Cl.
*B32B 27/30* (2006.01)
*E04F 15/10* (2006.01)

(58) Field of Classification Search
CPC ............ E04F 2201/03; E04F 15/02038; E04F 2201/0552; E04F 2201/023; E04F 2201/0547; E04F 2201/0153; E04F 2201/0138
USPC .. 52/592.1, 592.2, 592.3, 578, 588.1, 309.1, 52/309.3
See application file for complete search history.

(56) References Cited

U.S. PATENT DOCUMENTS

| | | | | |
|---|---|---|---|---|
| 2003/0203152 | A1* | 10/2003 | Higgins | B32B 27/12 428/92 |
| 2004/0221529 | A1* | 11/2004 | Zornes | E04B 1/14 52/311.1 |
| 2013/0067842 | A1* | 3/2013 | Meersseman | B44C 1/24 52/309.4 |
| 2013/0104485 | A1* | 5/2013 | Meersseman | B32B 3/06 52/578 |
| 2013/0192158 | A1* | 8/2013 | Cappelle | B32B 37/10 52/588.1 |
| 2017/0314273 | A1 | 11/2017 | Hugi et al. | |
| 2019/0292793 | A1* | 9/2019 | Van Vlassenrode | B32B 5/245 |
| 2019/0316363 | A1* | 10/2019 | Courey | B32B 9/046 |
| 2019/0383030 | A1* | 12/2019 | Lombaert | B32B 7/12 |
| 2020/0032526 | A1* | 1/2020 | Carpentier | E04F 15/107 |
| 2020/0047471 | A1* | 2/2020 | Cheng | B32B 38/0004 |

FOREIGN PATENT DOCUMENTS

| | | |
|---|---|---|
| CN | 106634661 A | 5/2017 |
| CN | 106700877 A | 5/2017 |
| CN | 106957501 A | 7/2017 |
| JP | 2010065426 A | 3/2010 |
| WO | 2011141851 A2 | 11/2011 |

* cited by examiner

OUTDOOR LAMINATE FLOOR AND A MANUFACTURING TECHNIQUE THEREOF

CROSS REFERENCE TO THE RELATED APPLICATIONS

This application is the national phase entry of International Application No. PCT/CN2018/106843, filed on Sep. 21, 2018, which is based upon and claims priority to Chinese Patent Application No. 201810326053.0, filed on Apr. 12, 2018, the entire contents of which are incorporated herein by reference.

TECHNICAL FIELD

The present invention belongs to the technical field of outdoor laminate flooring, and more specifically, relates to an outdoor laminate floor and a manufacturing technique thereof.

BACKGROUND

Outdoor flooring is typically used in the public spots such as gardens, pavilions and resorts where prolonged exposure to sunlight and rain necessitates high stability, corrosion resistance and compression resistance for outdoor floors.

Timber materials for outdoor use are integral components of building and decorative materials in China. Outdoor timber is exposed in open air for years and subject to various rigorous climates in various countries and regions, therefore, high strength, weather resistance and wear resistance are required of outdoor timber; meanwhile, easy installation and aesthetics are required as well. For a long time, outdoor timber has been dominated by natural solid hardwood, including large-size broadleaved hardwood from tropical rainforests such as African blackwood, Burmese teak wood and South American Ipe, and preservative-treated timber such as Mongolian Scots pine and Southern Yellow pine. However, the aforementioned outdoor laminate floors have the following disadvantages: (1) made of pine wood, pine floors wear poorly, susceptible to wear after long time use with costly maintenance; (2) in view of mostly outdoor use where environment changes greatly, in case of littered cigarette stubs, solid wood floors will suffer from poor flame retardancy and a low safety factor; (3) due to fast growth, pine wood is soft in quality with a multitude of knots on the timber surface where resin is largely secreted and exuded out of surface when exposed to the sunlight in the summer, which impacts aesthetics and use; (4) because of their "shrink when dry and swell when wet" property and anisotropy, harsh outdoor environment, big-amplitude and high-frequency change in moisture and temperature, and low anti-aging factor, solid wood planks are prone to substantial cracks and remarkable warping; (5) used in harsh environment, outdoor floors are prone to bores by termites and then rot, to lose value for use.

SUMMARY

The present invention provides a type of outdoor laminate floor to overcome the flaws of existing techniques.

The present invention solves technicalities by the following technical solution: a type of outdoor laminate floor comprising a substrate made from polyvinyl chloride (PVC) foaming and wear-resistant, anti-aging covering film that is adhered to the surface of the substrate, the said covering film overlaying the surface of the substrate after being adhered by hot glue; the said covering film is modified weather-resistant polymeric film.

Preferably, the said substrate is overall rectangular, extended with a protrusion at one end, the said protrusion being used for snap-on with the groove engineered at the other end;

Preferably, the said covering film comprises full-covering film that completely overlays the substrate and half-covering film that overlays both end surfaces of the substrate.

Preferably, texture patterns are set on the said substrate, the said texture patterns being set in between the end surface of the substrate and the distant end surface of the covering film to the substrate, texture patterns including wood-texture patterns.

Preferably, the said texture patterns are set on a sticker, both end surfaces of the said sticker being individually adhered to between the substrate and the covering film by hot glue.

Preferably, one end surface of the said covering film is coated with affinity reagent and printed with texture patterns, the distant end surface of the said texture patterns to the covering film being coated with affinity reagent and then with hot glue, the distant end of the said hot glue to the covering film (3) being coated with affinity reagent and securely affixed onto the substrate.

Preferably, one end surface of the said covering film is coated with affinity reagent and then with hot glue, the distant end surface of the said hot glue to the covering film being coated with affinity reagent and printed with texture patterns, the distant end surface of the said texture pattern to the covering film being securely affixed onto the substrate by hot glue.

Preferably, the said texture pattern is printed inside the covering film.

The technique for manufacturing the said outdoor laminate floor comprises the following steps:

S1: prepare standard format of board via PVC foaming, thereby forming substrate;
S2: set up texture patterns;
S3: apply film.

Compared to existing techniques, the present invention possesses the following benefits:

1. This invention provides a wear-resistant and anti-aging floor that features simple and compact structure and replaces solid wood with substrate and covering film, which does not only protect environment by reducing the demand for solid wood, but also leads to reduced manufacturing cost and an edge on the market, thanks to low-cost substrate and covering film;

2. In the present invention, Kleiberit adhesives are selected to tightly bond the two different materials, substrate and covering film. After long time use, the substrate and covering film will not peel off from each other, which does not only extend life of the floor but also effectively prevents the floor from warping and improves its life span by interaction between the substrate and covering film bonded together as a whole as well as reduced extensibility;

3. In the present invention, the selected covering film features superior wear-resistant and anti-aging performance, water- and moisture-resistant capability, and flame retardancy which endows outdoor floors with resistance to sunlight exposure and cigarette stub burning; protrusions and grooves engineered on outdoor floors work together to enable quick installation.

4. In the present invention, different texture patterns are set up on outdoor floors as opposed to different outdoor

DETAILED DESCRIPTION

In order to make clear the technical approaches implemented in this invention, features of this invention, purposes and effectiveness, the present invention is further elucidated with reference to specific embodiments.

Embodiment 1

Figure 1:
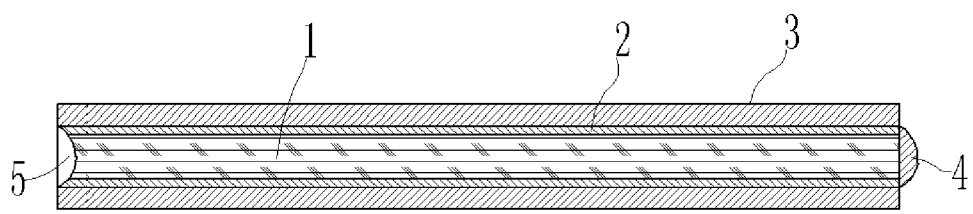
FIG. 1 is the schematic structure of the present invention.

As FIG. 1 shows, an outdoor laminate floor comprising a substrate 1 made from PVC foaming and wear-resistant, anti-aging covering film 3 that is adhered to the surface of the substrate 1 by hot glue. Specifically, the covering film 3 is modified weather-resistant polymeric film and the substrate 1 is overall rectangular, extended with a protrusion 4 at one end, the protrusion 4 being used for snap-on with the groove 5 engineered at the other end.

In order for the outdoor laminate floor provided in this invention to apply to various outdoor spots, texture patterns 2 are set on the substrate 1, the texture patterns 2 being set in between the end surface of the substrate 1 and the distant end surface of the covering film 3 to the substrate 1. Specifically, the texture pattern 2 is wood-texture pattern, the wood-texture pattern being set on a sticker, both end surfaces of the sticker being individually adhered to between the substrate 1 and the covering film 3 by hot glue.

In this invention, the technique for manufacturing the outdoor laminate floor comprises the following steps:

S1: prepare standard format of board via PVC foaming, thereby forming substrate;

S2: prepare a sticker which is clipped into a shape that matches the substrate and print the desired pattern onto the sticker by a 3D printer for later use;

S3: coat both sides of the sticker resulted in S2 with hot glue and adhere the sticker onto the substrate;

S4: adhere modified weather-resistant polymeric film onto the distant end surface of the sticker to the substrate, thereby forming the said outdoor laminate floor.

Embodiment 2

As FIG. 1 shows, the content of this embodiment is basically identical to that of Embodiment 1. With common part left out, the difference lies in: in order for the outdoor laminate floor provided in this invention to apply to various outdoor spots, texture patterns 2 are set on the substrate 1, the texture patterns 2 being set in between the end surface of the substrate 1 and the distant end surface of the covering film 3 to the substrate 1. Specifically, one end surface of the covering film 3 is coated with affinity reagent and printed with texture patterns 2, the distant end surface of the texture patterns 2 to the covering film 3 being coated with affinity reagent and then with hot glue, the distant end of the hot glue to the covering film 3 being coated with affinity reagent and securely affixed onto the substrate 1.

In this invention, the technique for manufacturing the outdoor laminate floor comprises the following steps:

S1: prepare standard format of board via PVC foaming, thereby forming substrate;

S2: one end surface of the covering film is coated with affinity reagent and printed with texture patterns, the distant end surface of the texture patterns to the covering film being coated with affinity reagent and then with hot glue;

S3: the distant end of the hot glue to the covering film is coated with affinity reagent and securely affixed onto the substrate, thereby forming the said outdoor laminate floor.

Embodiment 3

As FIG. 1 shows, the content of this embodiment is basically identical to that of Embodiment 1. With common part left out, the difference lies in: in order for the outdoor laminate floor provided in this invention to apply to various outdoor spots, texture patterns 2 are set on the substrate 1, the texture patterns 2 being set in between the end surface of the substrate 1 and the distant end surface of the covering film 3 to the substrate 1. Specifically, one end surface of the covering film 3 is coated with affinity reagent and then with hot glue, the distant end surface of the hot glue to the covering film 3 being coated with affinity reagent and printed with texture patterns 2, the distant end surface of the texture patterns 2 to the covering film 3 being securely affixed onto the substrate 1 by hot glue.

In this invention, the technique for manufacturing the outdoor laminate floor comprises the following steps:

S1: prepare standard format of board via PVC foaming, thereby forming substrate;

S2: one end surface of the covering film is coated with affinity reagent and then with hot glue, the distant end surface of the hot glue to the covering film being coated with affinity reagent and printed with texture patterns;

S3: the distant end surface of the texture patterns to the covering film is securely affixed onto the substrate by hot glue.

Embodiment 4

Figure 2:
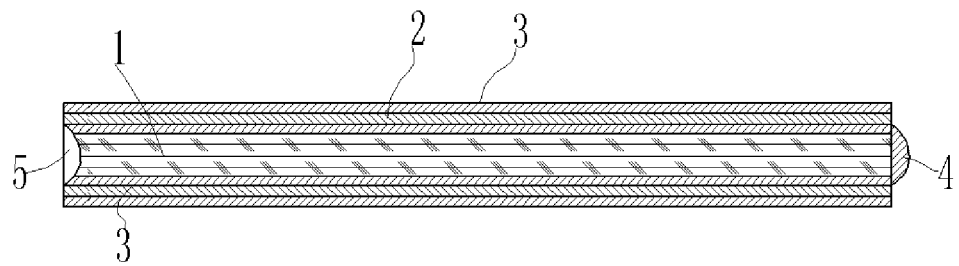
FIG. 2 is the schematic structure of the present invention;
In the figures: 1—substrate; 2—texture pattern; 3—covering film; 4—protrusion; 5—groove.

As FIG. 2 shows, the content of this embodiment is basically identical to that of Embodiment 1. With common part left out, the difference lies in: in order for the outdoor laminate floor provided in this invention to apply to various outdoor spots, texture pattern 2 is set on the substrate 1, the texture pattern 2 being set in between the end surface of the substrate 1 and the distant end surface of the covering film 3 to the substrate 1. Specifically, the texture pattern 2 is wood-texture pattern, the wood-texture pattern being printed inside the covering film 3.

In this invention, the technique for manufacturing the outdoor laminate floor comprises the following steps:

S1: prepare standard format of board via PVC foaming, thereby forming substrate;

S2: coat the substrate with hot glue and then overlay the substrate with modified weather-resistant polymeric film, during which thickness of the modified weather-resistant polymeric film is half as finally required of the product;

S3: coat the modified weather-resistant polymeric film with hot glue and adhere the associated wood-texture pattern onto the surface of the modified weather-resistant polymeric film;

S4: coat the wood-texture pattern with hot glue and overlay the wood-texture pattern with modified weather-resistant polymeric film, thereby forming the said outdoor laminate floor.

Thickness of the modified weather-resistant polymeric film overlay in S4 is half as finally required of modified weather-resistant polymeric film.

Control 1:

PVC covering film from U.S. is selected and made into outdoor floors identical to the above embodiments in structure and specification.

Control 2:

Commercially available regular outdoor floors are selected. Specifically, outdoor solid wood floors made of preservative-treated Scots pine provided by Shanghai Jiayan Industries Co., Ltd. are selected.

Test the outdoor laminate floors resulted in Embodiments 1~4 for UV resistance and antistatic performance that are measured in terms of UV (particularly at wavelengths 290-400 nm) transmittance and specific resistance Rs (resistance between corresponding edges per square unit of test samples) respectively. Meanwhile, other performance tests are conducted and compared to Control 1 and Control 2. The testing results are shown in Table 1:

TABLE 1

| Item | Technical specifications | Embodiment 1 | Embodiment 2 | Embodiment 3 | Embodiment 4 | Control 1 | Control 2 |
|---|---|---|---|---|---|---|---|
| Scratch resistance (N) | ≥17, surface ornament not broken | 45 | 46 | 45 | 45 | 30 | 20 |
| Surface hardness (HD) | ≥55 | 92 | 93 | 93 | 93 | 85 | 60 |
| Surface wear-resistance | Wear-resistant turns r ≥ 4000 for film layer | 16500 | 16660 | 16950 | 16950 | 17060 | 12000 |
| | ≤0.13 g/100r, paint film not worn away | 0.022 | 0.022 | 0.022 | 0.022 | 0.025 | 0.027 |
| Skid resistance | ≤35 | 15 | 15 | 15 | 15 | 18 | 30 |
| Boiled in high and low temperature water | | Pass | Pass | Pass | Pass | Pass | Fail |
| Elastic Modulus (GPa) | | 24.2 | 24.3 | 24.3 | 24.3 | 20 | 18 |
| Surface Resistance (MΩ) | | $9.6 \times 10^8$ | $9.6 \times 10^8$ | $9.6 \times 10^8$ | $9.6 \times 10^8$ | $8 \times 10^8$ | $6 \times 10^8$ |
| Thermal shock (S) 288° C. | | 475 | 474 | 476 | 476 | 450 | 420 |

The mechanism, main features and characteristics of this invention are shown and described above. Technical personnel in this industry should understand that the present invention is not limited to the above embodiments that together with the above descriptions only demonstrate the mechanism of the present invention. Within the idea and scope of this invention, it will derive various adaptions and improvements that will all fall into the protected range of this invention. The range to be protected for this invention is defined by the enclosed claims and equivalents thereof.

What is claimed is:

1. An outdoor laminate floor, comprising:
    a substrate, wherein the substrate is made from PVC foaming, and
    a covering film, wherein the covering film is wear-resistant and anti-aging, and is adhered to a surface of the substrate, the covering film overlays the surface of the substrate after being adhered by hot glue; and
    the covering film is a modified weather-resistant polymeric film;
    wherein the substrate is rectangular, a protrusion extends from a first end of the substrate, the protrusion is configured to be engaged with a groove, wherein the groove is arranged at a second end of the substrate; and
    the covering film comprises a full-covering film and a half-covering film, wherein the full-covering film overlays the substrate, and the half-covering film overlays two end surfaces of the substrate;
    wherein texture patterns are arranged on the substrate, the texture patterns are arranged between an end surface of the two end surfaces of the substrate and a first end surface of the covering film, wherein the first end surface of the covering film is away from the substrate, and the texture patterns comprise wood-texture patterns;
    wherein a second end surface of the covering film is coated with a first affinity reagent and printed with the texture patterns, an end surface of the texture patterns is coated with a second affinity reagent and then coated with the hot glue, wherein the end surface of the texture patterns is away from the covering film; an end of the hot glue is coated with a third affinity reagent and securely affixed onto the substrate, wherein the end of the hot glue is away from the covering film.

2. The outdoor laminate floor of claim 1, wherein the texture patterns are arranged on a sticker, both end surfaces of the sticker are adhered between the substrate and the covering film by the hot glue.

3. The outdoor laminate floor of claim 1, wherein the texture patterns are printed inside the covering film.

4. A process for manufacturing the outdoor laminate floor of claim 1, comprising the following steps:
    preparing a board in a standard format by using the PVC foaming to form the substrate;

arranging the texture patterns; and applying the covering film.

5. The process according to claim 4, wherein the texture patterns are arranged on a sticker, both end surfaces of the sticker are adhered between the substrate and the covering film by the hot glue.

6. The process according to claim 4, wherein the texture patterns are printed inside the covering film.

7. An outdoor laminate floor, comprising:
- a substrate, wherein the substrate is made from PVC foaming, and
- a covering film, wherein the covering film is wear-resistant and anti-aging, and is adhered to a surface of the substrate, the covering film overlays the surface of the substrate after being adhered by hot glue; and
- the covering film is a modified weather-resistant polymeric film;

wherein the substrate is rectangular, a protrusion extends from a first end of the substrate, the protrusion is configured to be engaged with a groove, wherein the groove is arranged at a second end of the substrate; and the covering film comprises a full-covering film and a half-covering film, wherein the full-covering film overlays the substrate, and the half-covering film overlays two end surfaces of the substrate;

wherein texture patterns are arranged on the substrate, the texture patterns are arranged between an end surface of the two end surfaces of the substrate and a first end surface of the covering film, wherein the first end surface of the covering film is away from the substrate, and the texture patterns comprise wood-texture patterns;

wherein a second end surface of the covering film is coated with a first affinity reagent and then coated with the hot glue, an end surface of the hot glue is coated with a second affinity reagent and printed with the texture patterns, wherein the end surface of the hot glue is away from the covering film; an end surface of the texture patterns is securely affixed onto the substrate by the hot glue, wherein the end surface of the texture patterns is away from the covering film.

* * * * *